United States Patent
Kadu

(10) Patent No.: US 11,765,097 B2
(45) Date of Patent: Sep. 19, 2023

(54) EFFICIENT AND PRECISE EVENT SCHEDULING FOR IMPROVED NETWORK PERFORMANCE, CHIP RELIABILITY AND REPARABILITY

(71) Applicant: Avago Technologies International Sales Pte. Limited, Singapore (SG)

(72) Inventor: Sachin Prabhakarrao Kadu, Fremont, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 17/587,594

(22) Filed: Jan. 28, 2022

(65) Prior Publication Data

US 2023/0246978 A1    Aug. 3, 2023

(51) Int. Cl.
*H04L 47/625* (2022.01)
*H04L 47/20* (2022.01)

(52) U.S. Cl.
CPC ............ *H04L 47/625* (2013.01); *H04L 47/20* (2013.01)

(58) Field of Classification Search
CPC ....... H04L 47/10; H04L 47/20; H04L 47/625; H04L 49/254; H04L 49/1546; H04L 49/3063; H04L 2012/5679
See application file for complete search history.

(56) References Cited

U.S. PATENT DOCUMENTS

| | | | |
|---|---|---|---|
| 5,922,046 A | 7/1999 | Thomas et al. | |
| 7,158,528 B2 | 1/2007 | Dell et al. | |
| 10,742,558 B1* | 8/2020 | Matthews | H04L 12/56 |
| 11,184,278 B2 | 11/2021 | Kadu | |
| 2007/0268931 A1* | 11/2007 | Shaikh | H04J 3/047 370/468 |
| 2013/0003556 A1* | 1/2013 | Boden | H04L 49/3063 370/235 |
| 2021/0203597 A1 | 7/2021 | Kadu | |

OTHER PUBLICATIONS

Extended European Search Report regarding application 22210098.4 dated Jun. 28, 2023.

* cited by examiner

*Primary Examiner* — Kan Yuen
(74) *Attorney, Agent, or Firm* — Foley & Lardner LLP

(57) ABSTRACT

Disclosed herein are related to systems and methods for scheduling network operations with synchronized idle slots. In one aspect, a system includes a first data path to provide a first set of packets and a second data path to provide a second set of packets. The system also includes an arbiter to arbitrate the first set of packets and the second set of packets. The arbiter may be configured to receive a request for a task, where the task may be performed during a clock cycle. Based on the request, the arbiter may cause a scheduler to schedule a first idle slot for the first data path, and schedule a second idle slot for the second data path. The arbiter may provide the first idle slot and the second idle slot.

20 Claims, 15 Drawing Sheets

900

```
┌─────────────────────────────────────────────────────────┐
│   Determine to support a packet collision avoid mode    │
│                          910                            │
└─────────────────────────────────────────────────────────┘
                            │
                            ▼
┌─────────────────────────────────────────────────────────┐
│                  Select the first arbiter               │
│                          920                            │
└─────────────────────────────────────────────────────────┘
                            │
                            ▼
┌─────────────────────────────────────────────────────────┐
│ Provide a first data packet through the first arbiter during a first clock │
│   cycle, while providing idle slots through the second arbiter             │
│                          930                            │
└─────────────────────────────────────────────────────────┘
                            │
                            ▼
┌─────────────────────────────────────────────────────────┐
│                 Select the second arbiter               │
│                          940                            │
└─────────────────────────────────────────────────────────┘
                            │
                            ▼
┌─────────────────────────────────────────────────────────┐
│ Provide a second data packet through the second arbiter during a │
│ second clock cycle, while providing idle slots through the first arbiter │
│                          950                            │
└─────────────────────────────────────────────────────────┘
```

FIG. 9

EFFICIENT AND PRECISE EVENT SCHEDULING FOR IMPROVED NETWORK PERFORMANCE, CHIP RELIABILITY AND REPARABILITY

TECHNICAL FIELD

The present disclosure generally relates to packet processing, and more specifically relates to methods and systems for providing scheduling of network operations to enhance network performance.

BACKGROUND

In packet processing devices such as network switches and routers, transitioning to smaller processing nodes was often sufficient to meet ever increasing performance targets. However, as the feature size of processing nodes approaches physical limitations, performance improvements become harder to achieve from process shrinkage alone. Meanwhile, high performance computing and other demanding scale out applications in the datacenter continue to require higher performance that is not met by conventional packet processing devices. Latency sensitive applications further require specialized hardware features, such as ternary content addressable memory ("TCAM"), which in turn imposes performance constraints that raise further hurdles in meeting performance targets.

DESCRIPTION OF THE FIGURES

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of this disclosure, the scope of which is set forth in the claims that follow.

FIG. 9 is a flow chart of a process to synchronize operations of two arbiters to prevent a packet collision, according to one or more embodiments.

DESCRIPTION

Figure 1A:
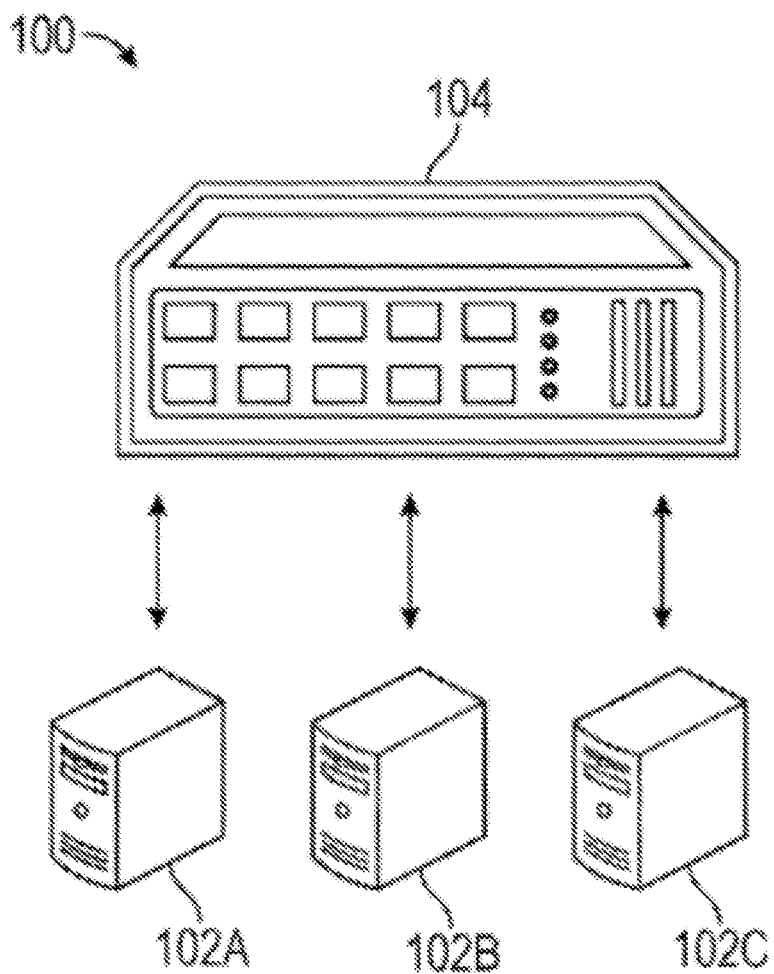
FIG. 1A is a diagram of an example network environment, according to one or more embodiments.

While aspects of the subject technology are described herein with reference to illustrative examples for particular applications, it should be understood that the subject technology is not limited to those particular applications. Those skilled in the art with access to the teachings provided herein will recognize additional modifications, applications, and aspects within the scope thereof and additional fields in which the subject technology would be of significant utility.

Disclosed herein are related to systems and methods for scheduling network operations. In one aspect, a network system includes a first data path to provide a first set of packets and a second data path to provide a second set of packets. The network system also includes an arbiter to arbitrate the first set of packets and the second set of packets. In one aspect, the arbiter is configured to receive a request for a task. The task may be scheduled to occur or to be performed during a clock cycle. Based on the request, the arbiter may generate a command to cause a scheduler to schedule a first idle slot for the first data path, and schedule a second idle slot for the second data path. An idle slot may be a null packet, or a packet with no data. According to the first idle slot, a pipe coupled between the first data path and the arbiter and between the second data path and the arbiter may bypass reading a packet from the first data path during the clock cycle to provide the first idle slot. Similarly, according to the second idle slot, the pipe may bypass reading a packet from the second data path during the clock cycle to provide the second idle slot. The arbiter may receive the first idle sot and the second idle slot from the pipe, and provide or output the first idle slot and the second idle slot during the clock cycle.

In one aspect, the disclosed network device (or network system) can reduce or avoid packet collisions to improve performances. For example, packet collisions from different data paths can increase power consumption and reduce throughput due to retransmission. In one aspect, an arbiter may provide or output a data packet from one data path, while enforcing synchronized idle slots for other data paths, such that the other data paths may bypass providing or outputting any packet. Accordingly, packet collisions can be avoided to lower power consumption and increase throughput.

In one aspect, the disclosed network device can improve a hardware learn rate. In one aspect, the disclosed network device allows learning or detecting a certain number (e.g., over 4 million) of features (e.g., MAC address, hash on any number of fields, source address, source IP address, etc.) of the network device for a given time period. In one example, learning a hardware feature includes extracting a certain field in a packet received, and checking if a matching entry of a table exists. Often, data from one or more data paths can interfere with the hardware learning process. By applying synchronized idle slots, hardware learning can be performed with less interference, such that a larger number of features of the network device can be determined for a given time period.

In one aspect, the disclosed network device can operate in a reliable manner, despite one or more erroneous processes. An erroneous process may exist, due to a false design by an engineer, or due to a hardware failure. For example, an unintended operation may be performed, or an operation may be performed at an unintended clock cycle. Such erroneous process may render the network device to be unreliable or unusable. Rather than discarding the network device, synchronized idle slots can be implemented for known erroneous processes. For example, idle slots can be enforced for a process from a faulty component, such that the process may be not executed or performed. Although the device may not perform intended processes associated with the erroneous processes, the disclosed network device can still perform other processes in a reliable manner and may not be discarded.

In one aspect, the disclosed network device can support a warm boot. In one aspect, various operations may be performed during a wake up sequence. In one example, a command or indication indicating no packet traffic can be provided. In response to the command or indication, the arbiter may ignore a packet spacing rule, and process data to support the wake up sequence, because there may be no data traffic from the data paths. By ignoring the packet spacing rule or other rules associated with data traffic, the disclosed network device can perform rigorous wake up sequence within a short time period (e.g., 50 ms).

In one aspect, the disclosed network device can achieve power savings by implementing idle slots. In one example, the device can detect or monitor power consumption of the device. In response to the power consumption exceeding a threshold value, the device may enforce idle slots. By enforcing idle slots, the arbiter or other components may not process data, such that power savings can be achieved.

FIG. 1A depicts an example network environment 100, according to one or more embodiments. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-C connected via a network switch 104. The electronic devices 102A-C may be connected to the network switch 104, such that the electronic devices 102A-C may be able to communicate with each other via the network switch 104. The electronic devices 102A-C may be connected to the network switch 104 via wire (e.g., Ethernet cable) or wirelessly. The network switch 104, may be, and/or may include all or part of, the network switch discussed below with respect to the ingress/egress packet processing 105 of FIG. 1B and/or the electronic system discussed below with respect to FIG. 10. The electronic devices 102A-C are presented as examples, and in other implementations, other devices may be substituted for one or more of the electronic devices 102A-C.

For example, the electronic devices 102A-C may be computing devices such as laptop computers, desktop computers, servers, peripheral devices (e.g., printers, digital cameras), mobile devices (e.g., mobile phone, tablet), stationary devices (e.g. set-top-boxes), or other appropriate devices capable of communication via a network. In FIG. 1A, by way of example, the electronic devices 102A-C are depicted as network servers. The electronic devices 102A-C may also be network devices, such as other network switches, and the like.

The network switch 104 may implement hyperscalar packet processing, which refers to a combination of several features that optimize circuit integration, reduce power consumption and latency, and improve performance for packet processing. Packet processing may include several different functions such as determining a correct port to forward a packet to its destination, gathering diagnostic and performance data such as network counters, and performing packet inspection and traffic categorization for implementing quality of service (QoS) and other load balancing and traffic prioritizing functions. Some of these functions may require more complex processing than other functions. Thus, one feature of hyperscalar packet processing is to provide two different packet processing blocks and arbitrate packets accordingly: a limited processing block (LPB) and a full processing block (FPB). Since packets may vary widely in the amount of required processing, it is wasteful to process all types of packets using a one size fits all packet processing block. By utilizing LPBs, smaller packets with less processing requirements can be quickly processed to provide very low latency. Further, since the LPBs may support a limited feature set, the LPBs can be configured to process more than one packet during a clock cycle compared to FPBs that process one packet, improving bandwidth and performance.

The number of LPBs and FPBs can be adjusted according to workload. The LPBs and FPBs may correspond to logical packet processing blocks in the Figures. However, in some implementations, the LPBs and FPBs may correspond to physical packet processing blocks or some combination thereof. For example, latency sensitive applications and transactional databases may prefer designs with a larger number of LPBs to handle burst traffic of smaller control packets. On the other hand, applications requiring sustained bandwidth of large packets such as content delivery networks or cloud backup may prefer designs with a larger number of FPBs.

Another feature is to organize processing blocks into physical groups providing a single logical structure with circuitry, such as logic and lookups, shared between the processing blocks to optimize circuit area and power consumption. Such grouped processing blocks may be able to process packets from multiple data paths, with corresponding data structures provided to allow coherent and stateful processing of packets. This may also enable an aggregate processing block to provide greater bandwidth to better absorb burst traffic and provide reliable response time in comparison to individual processing blocks with independent pipes that may become easily saturated, especially with increasing port speed requirements.

Another feature is to use a single shared bus and one or more arbiters for interfaces, allowing efficient utilization of available system bus bandwidth. The arbiter may enforce packet spacing rules and allow auxiliary commands to be processed when no packets are processed during a cycle.

Another feature is to provide slot event queues for data paths and a scheduler to enforce spacing rules and control the posting of events. By providing these features, events are not blocked by worst case data path latency, helping to further reduce latency and improve response time.

Figure 1B:
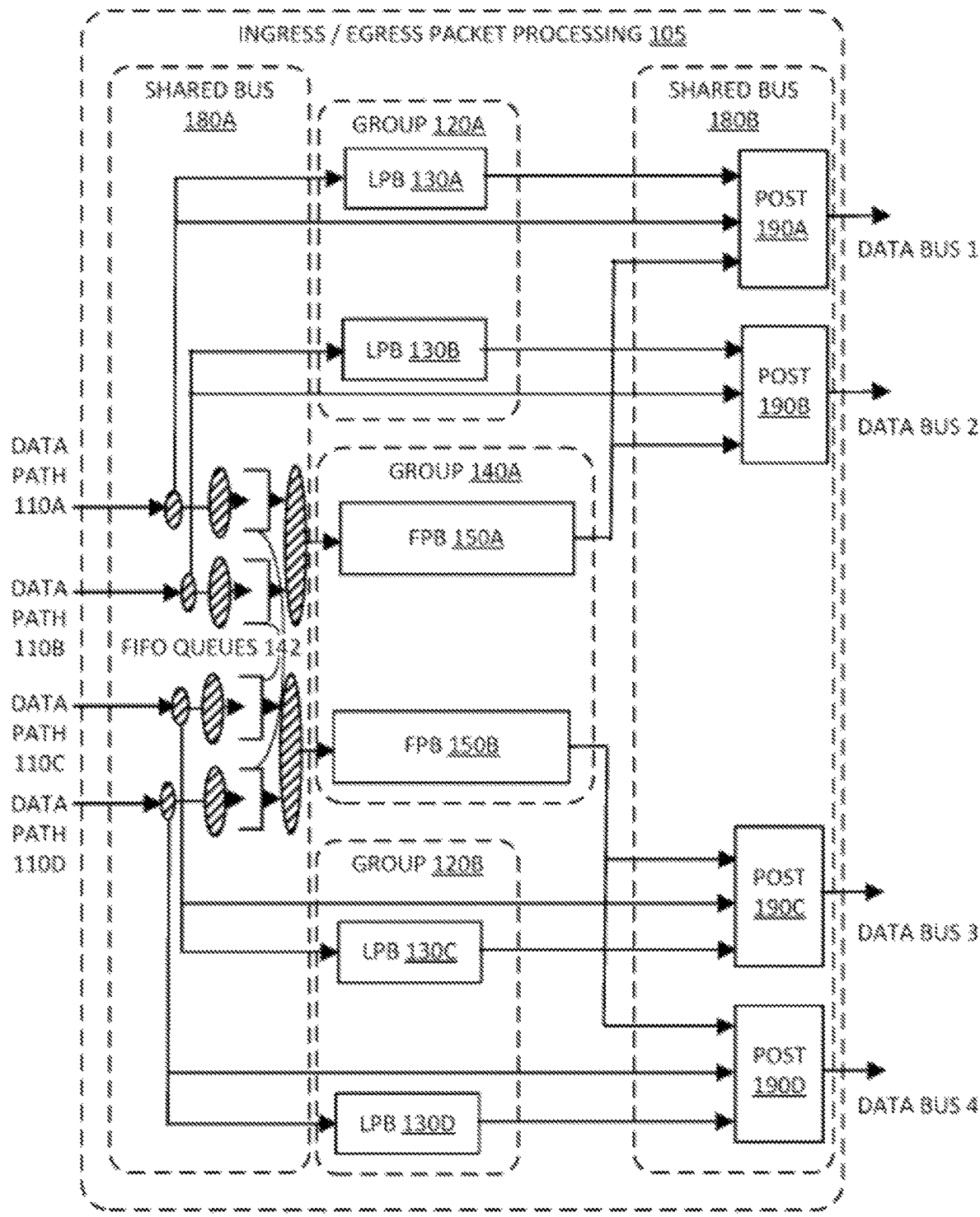
FIG. 1B is a block diagram of a logical block diagram of ingress/egress packet processing within an example network switch, according to one or more embodiments.

FIG. 1B is a block diagram of a logical block diagram of ingress/egress packet processing within an example network switch, according to one or more embodiments. While ingress packet processing is discussed in the below examples, ingress/egress packet processing 105 may also be adapted to egress packet processing. Ingress/egress packet processing 105 includes group 120A, group 120B, group 140A, first in first out (FIFO) queues 142, shared bus 180A, shared bus 180B, post 190A, post 190B, post 190C, and post 190D. Group 120A includes LPB 130A and LPB 130B. Group 120B includes LPB 130C and LPB 130D. Group 140A includes FPB 150A and FPB 150B. It should be understood that the specific layout shown in FIG. 1B is exemplary, and in other implementations any combination, grouping, and quantity of LPBs and FPBs may be provided.

As shown in FIG. 1B, data path 110A, data path 110B, data path 110C, and data path 110D may receive data packets that are arbitrated via shared bus 180A and shared bus 180B through various packet processing and posting blocks. The shared bus 180A and 180B may allow for more efficient bandwidth utilization across high speed interconnects compared to separate individual buses with smaller bandwidth capacities. Packets may, for example, be analyzed based on packet size. If a packet is determined to be at or below a threshold packet size, such as 64 bytes, 290 bytes, or another value, then the packet may be arbitrated to one of the limited processing blocks, or LPB 130A-130D. This threshold packet size may be stored as a rule of an arbitration policy. Besides packet size, the arbitration policy rules may also arbitrate based on fields in the packet headers such as a packet type field, a source port number, or any other field. For example, if a type field indicates that a packet is a barrier or control packet rather than a data packet, then the packet may be arbitrated to one of the limited processing blocks.

If the packet is determined to exceed the threshold packet size or if the arbitration policy rules otherwise indicate that packet should be sent to a full processing block, then the packet may be arbitrated to one of the full processing blocks, or FPB 150A-150B. The arbitration policy may also assign data paths to specific processing blocks. For example, data path 110A is assigned to either LPB 130A or FPB 150A in FIG. 1B. However, in other implementations, a data path may be arbitrated to any available processing block. The enforcement of arbitration policy may be carried out by an arbiter of shared bus 180A and 180B, as described below in FIG. 2D.

As discussed above, each LPB 130A-130D may be capable of processing multiple packets in a single clock cycle, or two packets in the particular example shown. For example, each LPB 130A-130D may support a limited set of packet processing features, such as by omitting deep packet inspection and other features requiring analysis of packet payloads. Since the data payload does not need to be analyzed, the data payload may be sent separately outside of LPB 130A-130D. In this manner, the processing pipeline may be simplified and reduced in length and complexity, allowing multiple limited feature packet processing pipelines to be implemented within a physical circuit area that may be equal to a single full feature packet processing pipeline. Thus, up to 8 packets may be processed by LPB 130A-130D, wherein each LPB 130A-130D may send two processed packets to respective post 190A-190D.

On the other hand, each FPB 150A-150B may process a single packet in a single clock cycle. Thus, up to 2 packets may be processed by FPB 150A-150B, wherein FPB 150A may send a processed packet to post 190A or post 190B, and FPB 150B may send a processed packet to post 190C or 190D. Post 190A-190D may perform post-processing by e.g. reassembling the processed packets with the separated data payloads, if necessary, and further preparing the assembled packets for sending on a data bus, which may include serializing the data packets. After post 190A-190D, the serialized and processed packets may be sent on respective data buses 1-4, which may further connect to a memory management unit (MMU).

Data paths 110A-110D may specifically correspond to ingress data buses in FIG. 1B. However, a similar design may be utilized for outputting to egress buses. Thus, when ingress/egress packet processing 105 corresponds to egress packet processing, data paths 110A-110D may correspond to post buses from the MMU, and post 190A-190D may output to respective egress data buses, which may further connect to upstream network data ports.

Groups 120A, 120B, and 140A may be organized to more efficiently share and utilize circuitry between and within the processing blocks contained in each group. In this way, circuit integration can be optimized, power consumption and latency can be reduced, and performance can be improved. For example, groups 120A, 120B, and 140A may share logic and lookups within each group to reduce total circuit area, as described in FIG. 2C. The reduced circuit area may consume less power. Group 140A may provide data structures to allow coherent and stateful processing of packets in an aggregate pipe, as described in FIG. 2E. Groups 120A-120B and 140A may further utilize separate data and processing pipelines described in FIG. 2C. Shared bus 180A and 180B may include arbiter 350 described in FIG. 3 or FIG. 4.

Figure 2A:
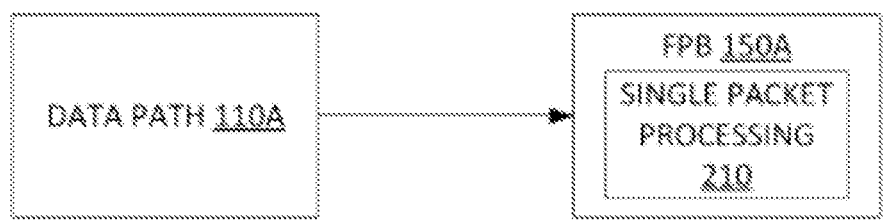
FIG. 2A is a block diagram of an example system for processing a single packet from a single data path, according to one or more embodiments.

FIG. 2A depicts an example system for processing a single packet from a single data path, according to one or more embodiments. As shown in FIG. 2A, a single data path, or data path 110A, is processed by a single full processing block, or FPB 150A. FPB 150A includes single packet processing 210, which is able to process a single packet of any size for each clock cycle. Data path 110A and single packet processing 210 may share the same clock signal frequency. In a packet processing device, the system of FIG. 2A may be duplicated for a number of data paths to support, which may correspond to a number of network ports.

Packets to be processed may include a head of packet (HOP) that includes a start of packet (SOP) indication and a number of bytes to be processed, a payload, and a tail of packet (TOP) that includes packet size and error information. The portions of the packet to be processed may be referred to the start and end of packet (SEOP), whereas the payload may be bypassed using a separate non-processing pipe.

Figure 2B:
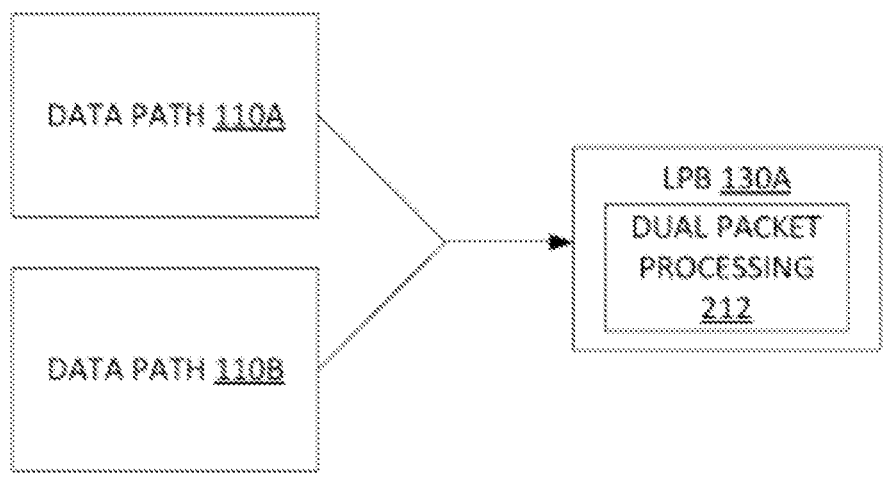
FIG. 2B is a block diagram of an example system for processing dual packets from two data paths, according to one or more embodiments.
Figure 4:
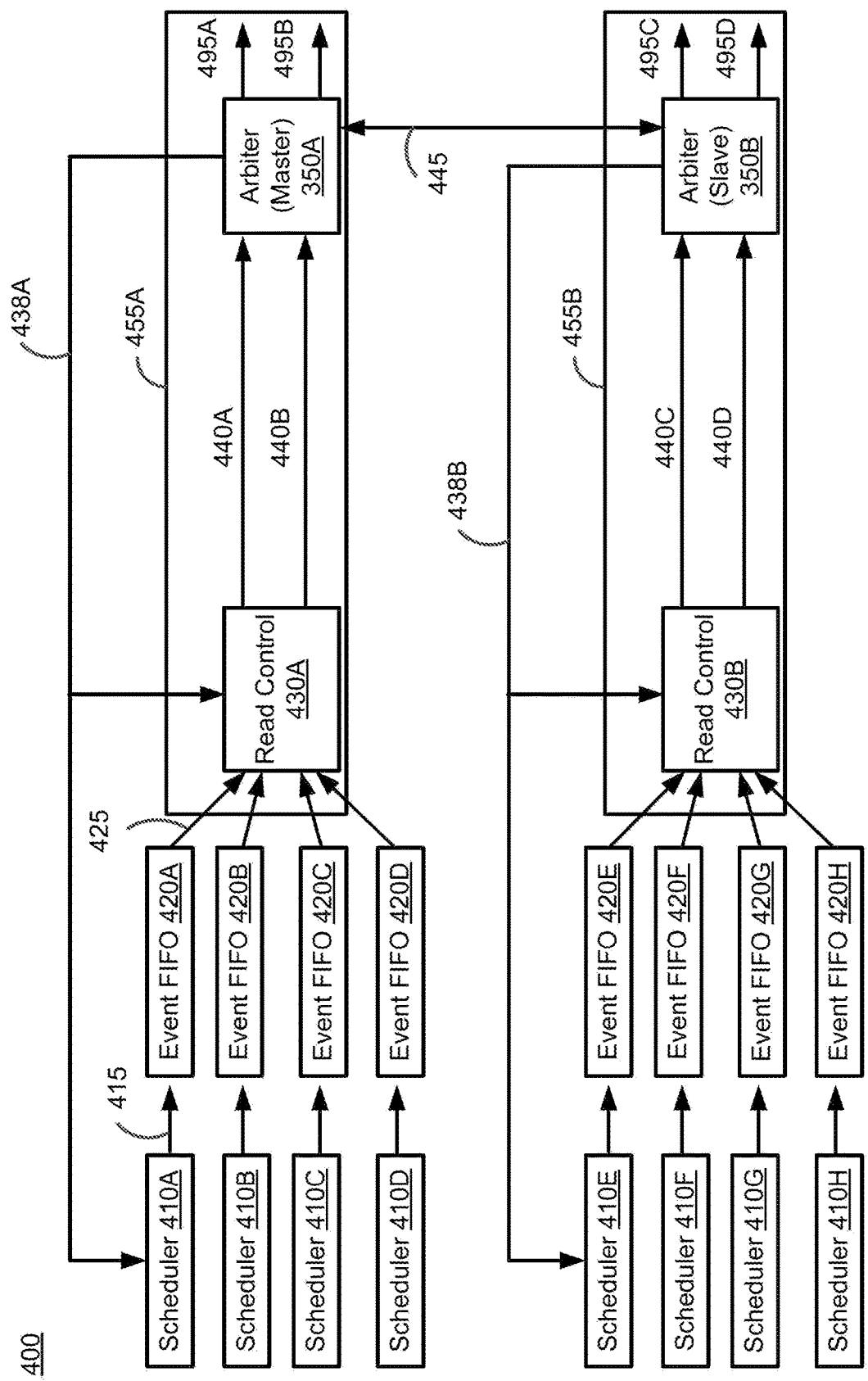
FIG. 4 is a block diagram of an example system for processing multiple packets from multiple paths with one or more schedulers, according to one or more embodiments.

FIG. 2B depicts an example system for processing dual packets from data paths 110A and 110B, according to one or more embodiments. As discussed above, a key insight is that packets may vary widely in the amount of required processing. When a packet is below a processing threshold, which can correspond to a packet size threshold, then the packet may be processed using a limited processing block such as LPB 130A. LPB 130A may be implemented using a far less complex circuit design compared to FPB 150A, which supports all possible functionality of all packets. Thus, LPB 130A can provide dedicated hardware to process multiple packets from multiple data paths in a single clock cycle. Dual packet processing 212 may process a packet from each of data paths 110A and 110B in a single clock cycle. Further, since LPB 130A is a separate block from FPB 150A, packets processed through LPB 130A can be completed quicker for lower latency. For example, as discussed above, the processing pipeline for LPB 130A may be significantly shorter than for FPB 150A. In one implementation, a minimum latency for processing a packet through LPB 130A may be approximately 25 ns, whereas a minimum latency for processing a packet through FPB 150A may be approximately 220 ns. While two data paths are shown in FIG. 2B, the concept of FIG. 2B may be extended to multiple data paths, such as eight data paths as shown in FIG. 4.

Figure 2C:
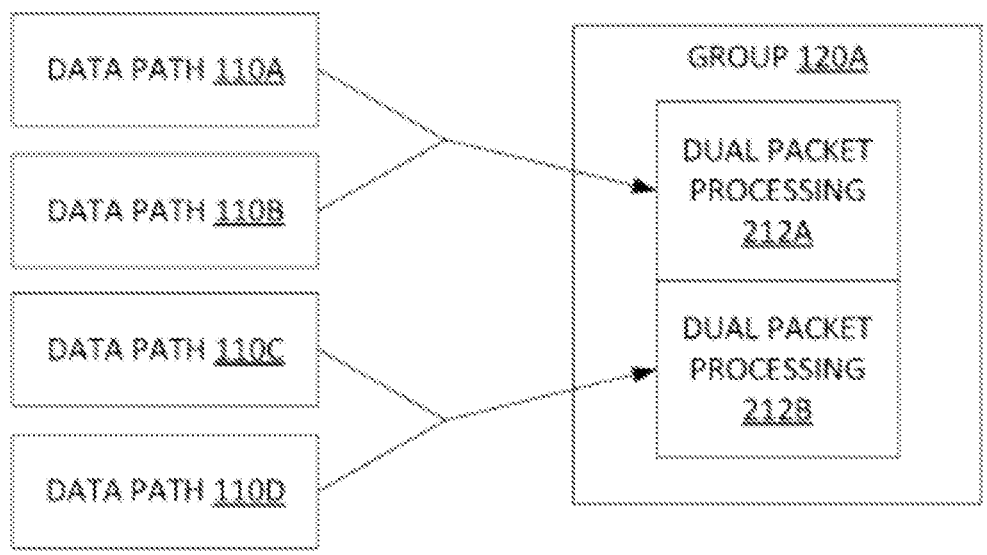
FIG. 2C is a block diagram of an example system for logically grouping two dual packet processing blocks together, according to one or more embodiments.

FIG. 2C depicts an example system for logically grouping dual packet processing 212A and 212B together, according to one or more embodiments. Group 120A includes dual packet processing 212A and 212B, which may be physically in proximity in a circuit layout. This proximity allows dual packet processing 212A and 212B to share logic and lookups for optimizing circuit area. At the same time, group 120A may also be logically grouped together to present a single logical processing block, for example by sharing logical data structures such as table structures. The incoming data packets from data paths 110A-110D may be arbitrated through a shared bus, such as shared bus 180A of FIG. 1B. To determine which processing block to route a data packet, an arbiter may be used, such as arbiter 350 of FIG. 3. While four data paths 110A-110D are shown in FIG. 2C, the concept of FIG. 2C may be extended to multiple data paths, such as eight data paths as shown in FIGS. 2I and 2H.

Figure 2D:
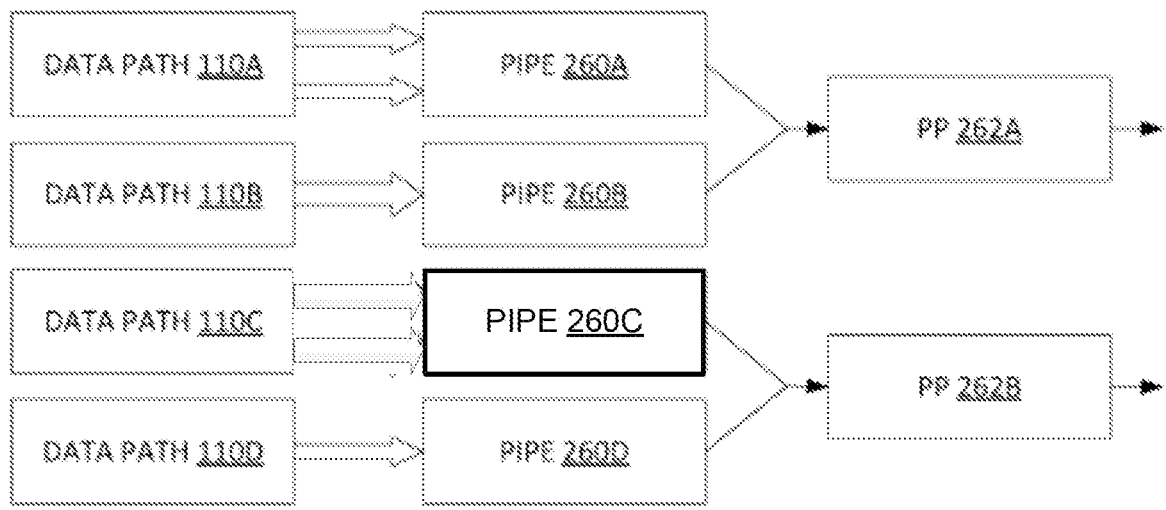
FIG. 2D is a block diagram of an example system for arbitrating data paths through individual packet processing pipes, according to one or more embodiments.

FIG. 2D depicts an example system for routing data paths 110A-110D through individual packet processing pipes, or pipes 260A-260D arbitrating into packet processing (PP) 262A-262B, according to one or more embodiments. Pipes 260A-260D may correspond to FIFO queues 142 from FIG. 1B. Each PP 262A-262B may include a full processing block, similar to FPB 150A.

Figure 2E:
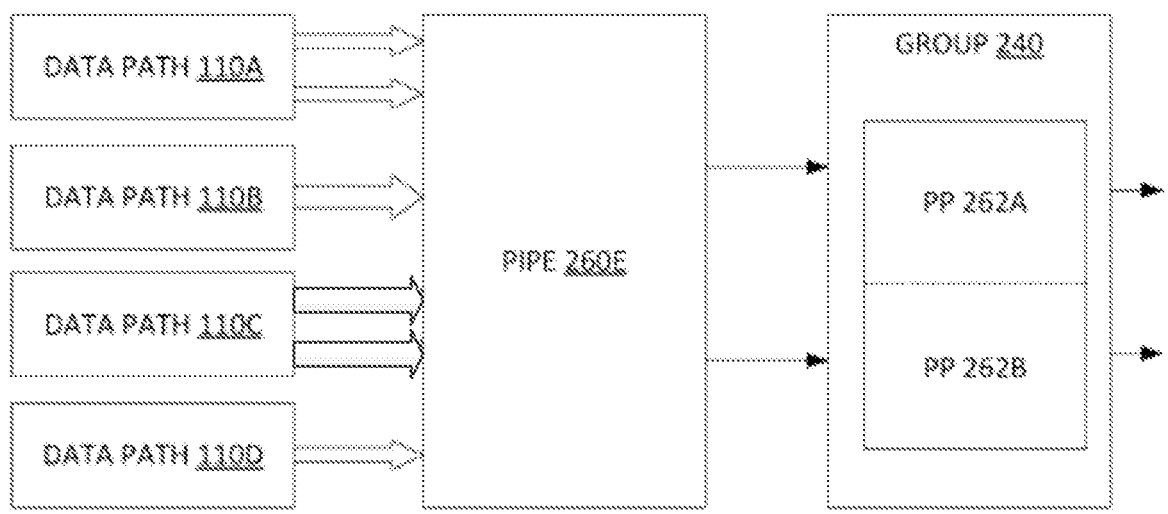
FIG. 2E is a block diagram of an example system for arbitrating data paths through an aggregate packet processing pipe, according to one or more embodiments.

FIG. 2E depicts an example system for arbitrating data paths 110A-110D through an aggregate packet processing pipe, or pipe 260E, according to one or more embodiments. As shown in FIG. 2E, rather than processing through independent pipes 260A-260D, a single aggregate pipe 260E is provided, which may support combined bandwidth corresponding to the sum of pipes 260A-260D. This allows pipe 260E to better handle burst traffic from any of data paths 110A-110D, helping to avoid latency and dropped packets. However, this may result in multiple packets from the same flow or data path to be processed in a single cycle by group 240. To support this, data structures may be provided to enable coherent and stateful processing of packets in group 240.

For example, hardware data structures may be provided such that counters, meters, elephant traps (ETRAPs) and other structures may be accessible for concurrent reads and writes across PP 262A-262B, even when processing packets from the same data path. Such hardware data structures for group 240 may include four 4 read, 1 write structures, or two 4 read, 2 write structures, or one 4 read, 4 write structure.

Figure 2F:
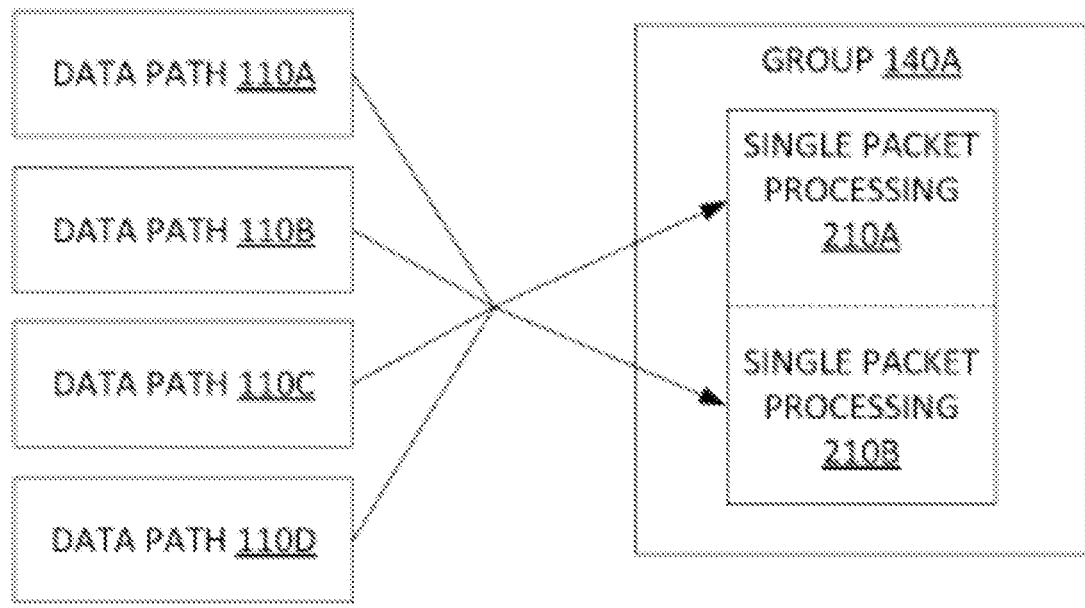
FIG. 2F is a block diagram of an example system combining the logical grouping of FIG. 2C with the aggregate packet processing pipe of FIG. 2E, according to one or more embodiments.
Figure 3:
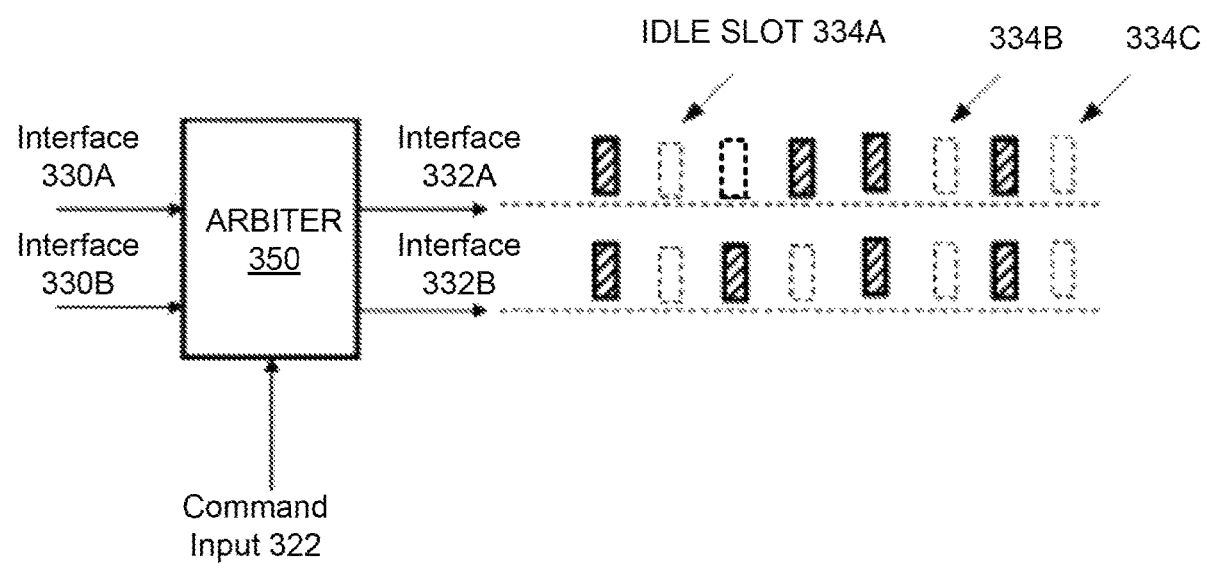
FIG. 3 is a block diagram of an arbiter providing synchronized idle slots, according to one or more embodiments.

FIG. 2F depicts an example system combining the logical grouping of FIG. 2C with the aggregate packet processing pipe of FIG. 2E, according to one or more embodiments. As shown in FIG. 2F, any of data paths 110A-110D may be processed by either single packet processing 210A or 210B. For example, arbiter 350 as shown in FIG. 3 may be provided in a shared bus to arbitrate the packets into group 140A. As with group 240 in FIG. 2E, group 140A may receive packets from an aggregate pipe. Thus, group 140A may include similar hardware data structures to support coherent and stateful processing.

Figure 2G:
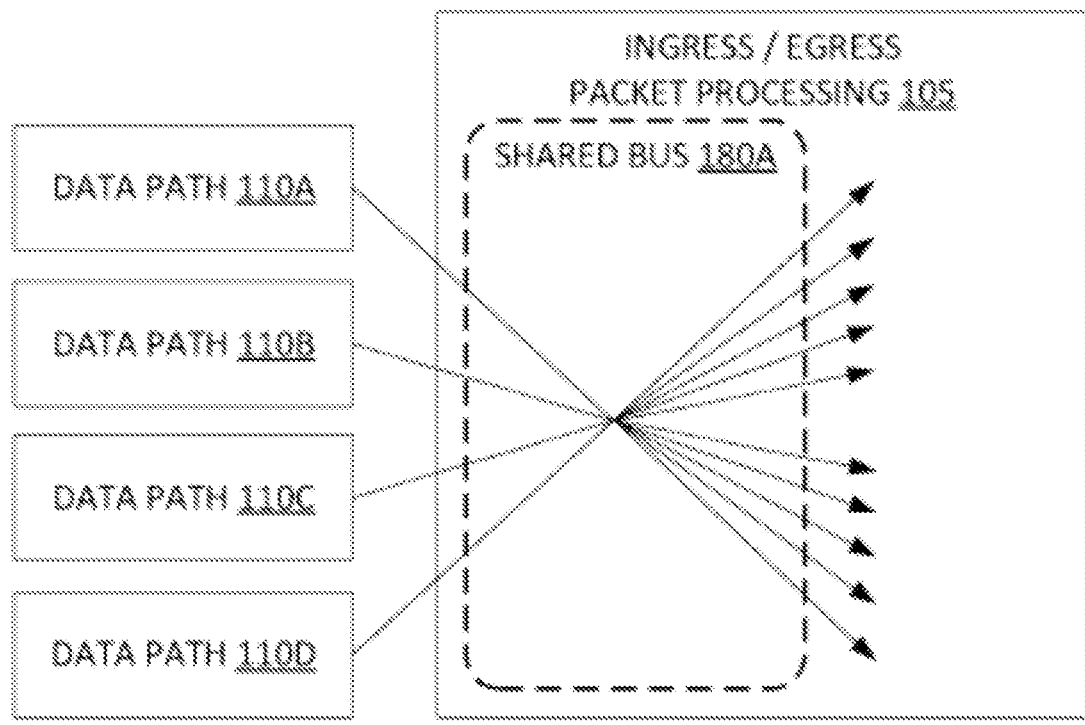
FIG. 2G is a block diagram of an example system combining the features shown in FIG. 2A-2F, according to one or more embodiments.
Figure 2H:
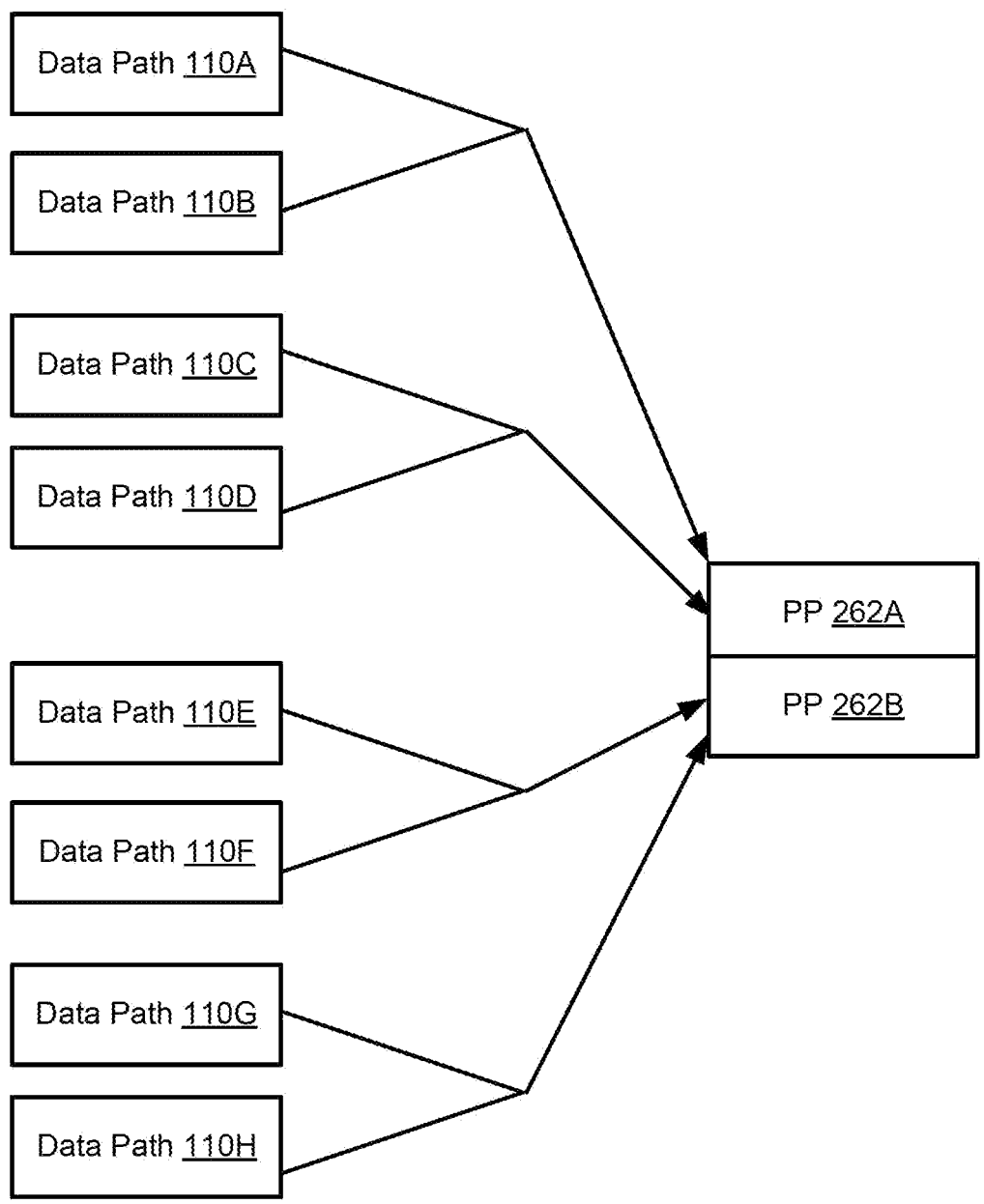
FIG. 2H is a block diagram of an example system for processing multiple packets from eight data paths through two threads of packet processing, according to one or more embodiments.
Figure 2I:
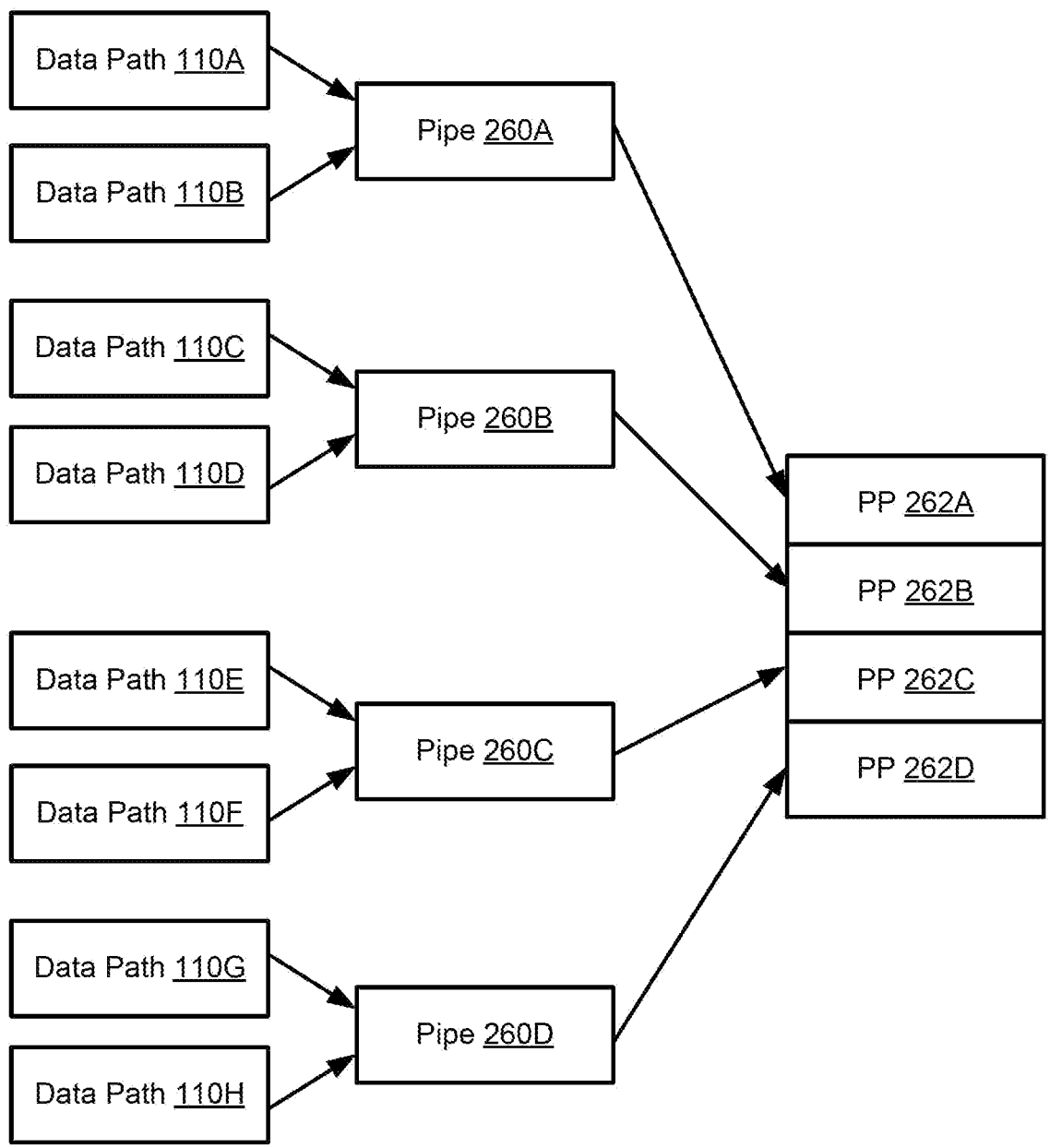
FIG. 2I is a block diagram of an example system for processing multiple packets from eight data paths through four threads of packet processing, according to one or more embodiments.

FIG. 2G depicts an example system combining the features shown in FIG. 2A-2F, according to one or more embodiments. As shown in FIG. 2G, four data paths 110A-110D may be processed through ingress/egress packet processing 105 of network switch 104, which may implement the features described in FIG. 2A-2F. For example, referring to FIG. 1B, up to 10 packets may be processed by network switch 104 in a single cycle.

FIG. 2H is a block diagram of an example system for processing multiple packets from eight data paths 110A-110H through 2 threads of packet processing, according to one or more embodiments. As shown in FIG. 2H, data paths 110A, 110B can be grouped as a first group, and data paths 110C, 110D can be grouped as a second group, where the first group and the second group can be provided to a first packet processing 262A. Similarly, data paths 110E, 110F can be grouped as a third group, and data paths 110G, 110H can be grouped as a fourth group, where the third group and the fourth group can be provided to a second packet processing 262B. In this structure, multiple packets from eight data paths 110A-110H can be provided and processed through packet processing 262A, 262B. In one aspect, packet processing 262A, 262B may share logic circuits or various components to reduce area circuit area.

FIG. 2I is a block diagram of an example system for processing multiple packets from eight data paths 110A-110H through four threads of packet processing 262A-262D, according to one or more embodiments. As shown in FIG. 2I, data paths 110A, 110B can be grouped and provided to a packet processing 262A through a pipe 260A, and data paths 110C, 110D can be grouped and provided to a packet processing 262B through a pipe 260B. Data paths 110E, 110F can be grouped and provided to a packet processing 262C through a pipe 260C, and data paths 110G, 110H can be grouped and provided to a packet processing 262D through a pipe 260D. The incoming data packets from data paths 110A-110H may be arbitrated through a shared bus, such as shared bus 180A of FIG. 1B. To determine which processing block to route a data packet, an arbiter may be used, such as arbiter 350 of FIG. 3.

In one aspect, the system shown in FIG. 2I can achieve high bandwidth (e.g., 12.8 TBps) with low power consumption. In one example, packet processing 262A-262D may share logic circuits or various components to reduce area circuit area. For example, multiples or combinations of systems shown in FIGS. 2A-2H can be implemented to achieve the same bandwidth (e.g., 12.8 TBps) as the system shown in FIG. 2I, but may consume a larger power or may be implemented in a larger area than the system shown in FIG. 2I.

FIG. 3 is a block diagram of an arbiter 350 providing synchronized idle slots, according to one or more embodiments. While the arbiter 350 is shown to include two input interfaces 330A, 330B and two output interfaces 332A, 332B, it should be understood that the number of interfaces can be scaled according to the bus arbitration requirements, e.g. as in shared bus 180A and 180B. Thus, shared bus 180A and 180B may include a respective arbiter 350. Arbiter 350 may receive packets from multiple data paths, or interfaces 330A and 330B. Arbiter 350 may therefore be used to arbitrate multiple data paths through a single, shared bus for improved interconnect bandwidth utilization. Based on packet size arbitration rules and packet spacing rules defined in an arbitration policy, arbiter 350 may output packets for processing via interfaces 332A and 332B, which may further connect to packet processing blocks. The packet spacing rules may be enforced on a per-group basis. For example, the packet spacing rules may enforce a minimum spacing between certain packets according to data dependency, traffic management, pipelining rules, or other factors. For example, to reduce circuit complexity and power consumption, pipelines may be simplified to support successive commands of a particular type, e.g. table initialization commands, only after a full pipeline is completed, e.g. 20 cycles. Thus, when such a table initialization command is encountered, the packet spacing rules may enforce a minimum spacing of 20 cycles before another table initialization command can be processed. The arbitration policy may also enforce assignment of data paths to certain interfaces, which may allow table access structures to be implemented in a simplified manner, e.g. by reducing multiplexer and de-multiplexer lines.

When no packets are to be processed in a group, such as during idle slots 334A, 334B, and 334C, arbiter 350 may output ancillary or auxiliary commands received from command input 322, which may be received from a centralized control circuit. For example, the ancillary commands may perform bookkeeping, maintenance, diagnostics, warm boot, hardware learn, power control, packet spacing, and other functions outside of the normal packet processing functionality.

FIG. 4 is a block diagram of an example system 400 for processing multiple packets from multiple paths with one or more schedulers, according to one or more embodiments. In some embodiments, the system 400 can be a part of the shared bus 180A or the system shown in FIG. 2I. In some embodiments, the system 400 includes schedulers 410A-410H, event FIFOs 420A-420H, read control circuit 430A, 430B and arbiters 350A, 350B. These components may be embodied as a field programmable gate array (FPGA), application specific integrated circuit (ASIC), one or more logic circuits, or any combination of them. These components may operate together to route packets or data streams from data paths 110A-110H to packet processing 262A-262D based on synchronized idle slots (e.g., idle slots 334). In one aspect, the system 400 includes a first pipe 455A encompassing the read control circuit 430A and the arbiter 350A, and a second pipe 455B encompassing the read control circuit 430B and the arbiter 350B. In some embodiments, the system 400 includes more, fewer, or different components than shown in FIG. 4.

In some embodiments, the arbiters 350A, 350B are components that route or arbitrate packets or data streams from the data paths 110A-110H to packet processing 262A-262D. In one example, the arbiters 350A, 350B may operate separately or independently from each other, such that the arbiter 350A may route or arbitrate packets or data streams from the data paths 110A, 110B to packet processing 262A, 262B through outputs 495A, 495B and the arbiter 350B may route or arbitrate packets or data streams from the data paths 110C, 110D to packet processing 262C, 262D through outputs 495C, 495D. In one example, the arbiters 350A, 350B may exchange a synchronization command 445, and operate together in a synchronized manner, according to the synchronization command 445. For example, the arbiters 350A, 350B may provide idle slots at outputs 495A-495D simultaneously to reduce power consumption or perform other ancillary operations.

In some embodiments, the schedulers 410A-410H are circuits or components to schedule the FIFOs 420 to provide packets. Although the schedulers 410A-410H are shown as separate circuits or components, in some embodiments, the schedulers 410A-410H may be embodied as a single circuit or a single component. In one aspect, each scheduler 410 may schedule operations for a corresponding data path 110, for example, according to an instruction or command from the arbiter 350. For example, each scheduler 410 may provide a packet 415 (or a start of packet) from a respective data path 110 to a respective event FIFO 420.

In some embodiments, the event FIFOs 420A-420D are circuits or components that provide packets 415 to the pipe 455A or the read control circuit 430A, and the event FIFOs 420E-420H are circuits or components that provide packets 415 to the pipe 455B or the read control circuit 430B. Each event FIFO 420 may be associated with a corresponding data path 110. Each event FIFO 420 may implement a queue to provide or output packets 425 in the order that the packets 425 are received.

In some embodiments, the read control circuits 430A and 430B are circuits or components to receive packets 425 from event FIFOs 420, and provide packets to corresponding arbiters 350. For example, the read control circuit 430A receives packets 425 from event FIFOs 420A-420D, and provides packets to the arbiter 350A. For example, the read control circuit 430B receives packets 425 from event FIFOs 420E-420H, and provides packets to the arbiter 350A. In one aspect, the read control circuit 430 may apply randomization or round robin function to provide packets from FIFOs 420 to the arbiter 350.

In one aspect, the arbiters 350A, 350B may request idle slots. An idle slot may be a null packet, or a packet with no data. The arbiters 350A, 350B may receive a command or an instruction from a centralized control unit (or a processor) for one or more operations of a task. Examples of a task may include power saving, warm boot, hardware learning, time spacing, etc. In response to the command or instruction, the arbiter 350A may provide an idle slot request command 438A to one or more corresponding schedulers 410A-410D and the read control circuit 430A, and the arbiter 350B may provide an idle slot request command 438B to one or more corresponding schedulers 410E-410H and the read control circuit 430B. In response to the idle slot request command 438, the scheduler 410 may provide an idle slot (or packet with no data) to the read control circuit 430A to generate an idle slot. In response to the idle slot (or packet with no data) from a FIFO, the read control circuit 430 may provide the idle slot (or packet with no data) to the arbiter 350 through one or more interfaces 440. In response to the idle slot request command 438, the read control circuit 430 may bypass reading packets from corresponding FIFOs 420, such that an idle slot (or packet with no data) can be provided to the arbiter 350 through one or more interfaces 440.

In one aspect, the read control circuit 430 indicates or marks whether idle slots are generated in response to the idle slot request command 438 or not. According to the indication or mark, the arbiter 350 may determine that the idle slot or a packet with no data is explicitly generated in response to the idle slot request command 438. Accordingly, the arbiter 350 may avoid erroneously responding to incidental packets with no data.

In one aspect, the system 400 can improve a hardware learn rate. In one aspect, the system 400 allows learning or detecting a certain number (e.g., over 4 million) of features (e.g., MAC address, hash on any number of fields, source address, source IP address, etc.) of the system 400 for a given time period. In one example, learning a hardware feature includes extracting a certain field in a packet received, and checking if a matching entry of a table exists. Often, data from one or more data paths (e.g., data paths 110A-100H) can interfere with the hardware learning process. The arbiters 350A, 350B can enforce synchronized idle slots, such that hardware learning can be performed with less interference and a set number of features of the system 400 can be determined for a given time period.

In one aspect, the system 400 can operate in a reliable manner, despite one or more erroneous processes. An erroneous process may exist, due to a false design by an engineer, or due to a hardware failure. For example, an unintended operation may be performed, or an operation may be performed at an unintended clock cycle. Such erroneous process may render the system 400 unreliable or unusable. Rather than discarding the system 400, the arbiters 350A, 350B can enforce idle slots for known erroneous processes. For example, the arbiters 350A, 350B may identify or determine that an instruction from a particular component is associated with processes from faulty components, and can enforce the idle slots, in response to identifying that the instruction is from a faulty component. Accordingly, erroneous processes due to such instruction may not be performed. Although the system 400 may intentionally not perform erroneous processes, the system 400 can perform other processes in a reliable manner and may not be discarded.

In one aspect, the system 400 can support a warm boot. In one aspect, various operations may be performed during a wake up sequence. In one example, the wake up sequence involves: resetting the chip, configuring phase locked loop, enabling IP/EP clock, bringing MMU or processors out of reset, setting program registers, accessing TCAM, etc. In one example, the arbiters 350A, 350B may receive a command or indication indicating no packet traffic. In response to the command or indication, the arbiters 350A, 350B may ignore or bypass a packet spacing rule, and process data to support the wake up sequence, because there may be no data traffic from the data paths (or data paths 110A-100H). By ignoring or bypassing the packet spacing rule or other rules associated with data traffic, the system 400 can perform a rigorous wake up sequence within a short time period (e.g., 50 ms).

In one aspect, the system 400 can achieve power savings by implementing idle slots. In one example, the system 400 can detect or monitor power consumption of the system 400. For example, the system 400 may include a power detector that detects or monitors power consumption of the system 400. In response to the power consumption exceeding a threshold value or threshold amount, the power detector or a centralized control circuit can provide an instruction or a command to the arbiters 350A, 350B to reduce power consumption. In response to the instruction or command provided, the arbiters 350A, 350B may enforce idle slots. By enforcing idle slots, the arbiters 350A, 350B or other components may not process data, such that power consumption can be reduced.

In one aspect, the system 400 can support various operation modes or operating conditions. In one example, two arbiters 350A, 350B of two pipes (e.g., pipe 455A, 455B) can provide data packets simultaneously at outputs 495A, 495B, 495C, 495D. In one example, the first arbiter 350A of the pipe 455A can provide data packets at outputs 495A, 495B, while the second arbiter 350B of the pipe 455B can support ancillary operations, which may access macros shared within the pipe 455B. In one example, the first arbiter 350A of the pipe 455A can provide idle slots at outputs 495A, 495B, while the second arbiter 350B of the pipe 455B can support ancillary operations, which may access macros shared across the pipes 455A, 455B.

Figure 5:
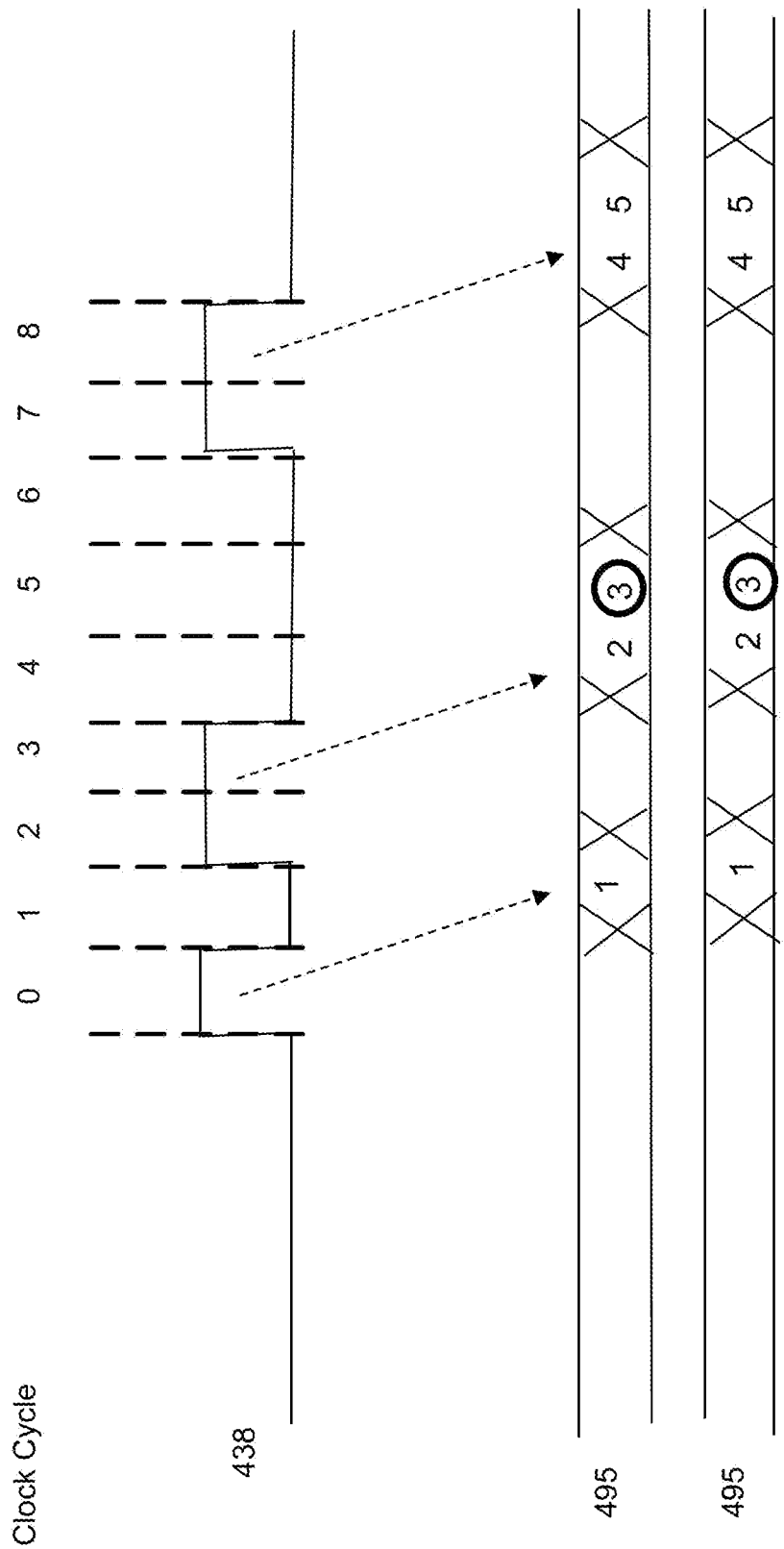
FIG. 5 show example waveforms for generating synchronized null slots, according to one or more embodiments.

FIG. 5 show example waveforms for generating synchronized null slots, according to one or more embodiments. In the example shown in FIG. 5, the arbiter 350 may generate idle slot request command 438 requesting idle slots for a zeroth clock cycle, a second clock cycle, a third clock cycle, a seventh clock cycle, and an eighth clock cycle. According to the idle slot request command 438, the arbiter 350 may provide or enforce idle slots at the requested clock cycles. In one example, a centralized control circuit (or processor) may provide an instruction or command with respect to a particular clock cycle, and request to generate one or more idle slots for other clock cycles with respect to the particular clock cycle. For example, centralized control circuit may provide an instruction or command with respect to a third clock cycle, and may also indicate to generate idle slots for three and one clock cycles before the third clock cycle, and four and five clock cycles after the third clock cycle. In response to the command or the instruction, the arbiter 350 may generate the idle slot request command 438 to cause the scheduler 410 and the read control circuit 430 to provide idle slots at corresponding clock cycle (e.g., zeroth clock cycle, a second clock cycle, a third clock cycle, a seventh clock cycle, and an eighth clock cycle). Advantageously, the arbiter 350 may provide multiple idle slots for a single instruction or command (e.g., an instruction or command provided in response to an erroneous request or associated with an erroneous request). In one example, an erroneous request from a known source (e.g., processor) due to false design or errors can be bypassed, according to the single instruction or command causing idle slots for multiple clock cycles.

Figure 6:
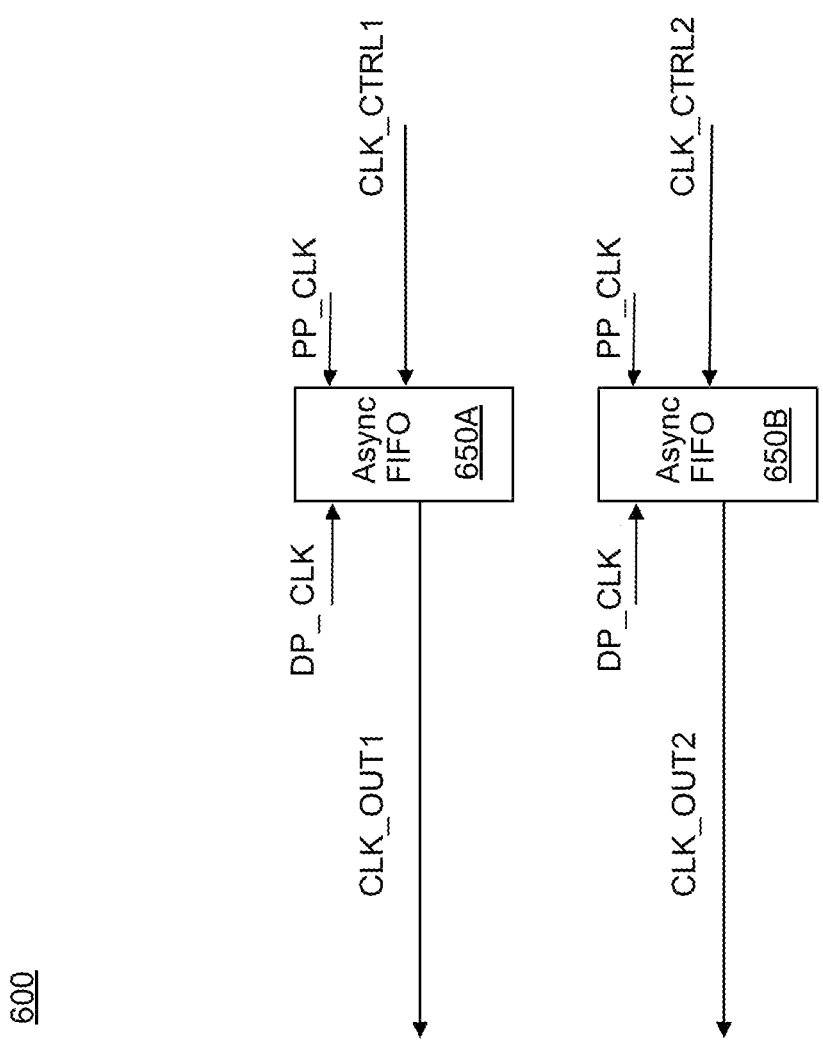
FIG. 6 is a block diagram of a circuit to provide different clocks for a scheduler, according to one or more embodiments.

FIG. 6 is a block diagram of a circuit 600 to provide different clocks for a scheduler 410, according to one or more embodiments. In one aspect, the circuit 600 is included in the system 400 or coupled to the system 400. The circuit 600 may provide adaptive clock signals CLK_OUT1, CLK_OUT2 to the schedulers 410A-410H. In some embodiments, the circuit 600 includes FIFOs 650A, 650B.

The FIFO 650A may receive a clock control signal CLK_CTRL1, for example, from the arbiter 350A. In response to the clock control signal CLK_CTRL1, the FIFO 650A circuit may provide a selected one of a data path clock signal DP_CLK or a packet processing clock signal PP_CLK to corresponding schedulers 410 (e.g., schedulers 410A-410D) as a clock output CLK_OUT1, according to the clock control signal CLK_CTRL1. The data path clock signal DP_CLK may be a clock signal of a data path 110, and the packet processing clock signal PP_CLK may be a clock signal of a packet processing 262.

Similarly, the FIFO 650B may receive a clock control signal CLK_CTRL2, for example, from the arbiter 350B. In response to the clock control signal CLK_CTRL2, the FIFO 650B circuit may provide a selected one of the data path clock signal DP_CLK or the packet processing clock signal PP_CLK to corresponding schedulers 410 (e.g., schedulers 410E-410H) as a clock output CLK_OUT2, according to the clock control signal CLK_CTRL2.

In one aspect, the arbiters 350A, 350B may provide clock control signals CLK_CTRL1, CLK_CTRL2, to allow the schedulers 410 to adaptively operate. In some cases, a frequency of the data path clock signal DP_CLK may be higher than a frequency of a packet processing clock signal PP_CLK. In some cases, a frequency of the data path clock signal DP_CLK may be lower than the frequency of the packet processing clock signal PP_CLK. The circuit 600 can be configured, such that one of the data path clock signal DP_CLK and the packet processing clock signal PP_CL having a higher frequency can be provided to the schedulers 410 as clock outputs CLK_OUT1, CLK_OUT2. By selectively providing the clock outputs CLK_OUT1, CLK_OUT2, the system 400 can support operations in different modes or configurations with different clock frequencies of the data path clock signal DP_CLK and the packet processing clock signal PP_CLK.

Figure 7:
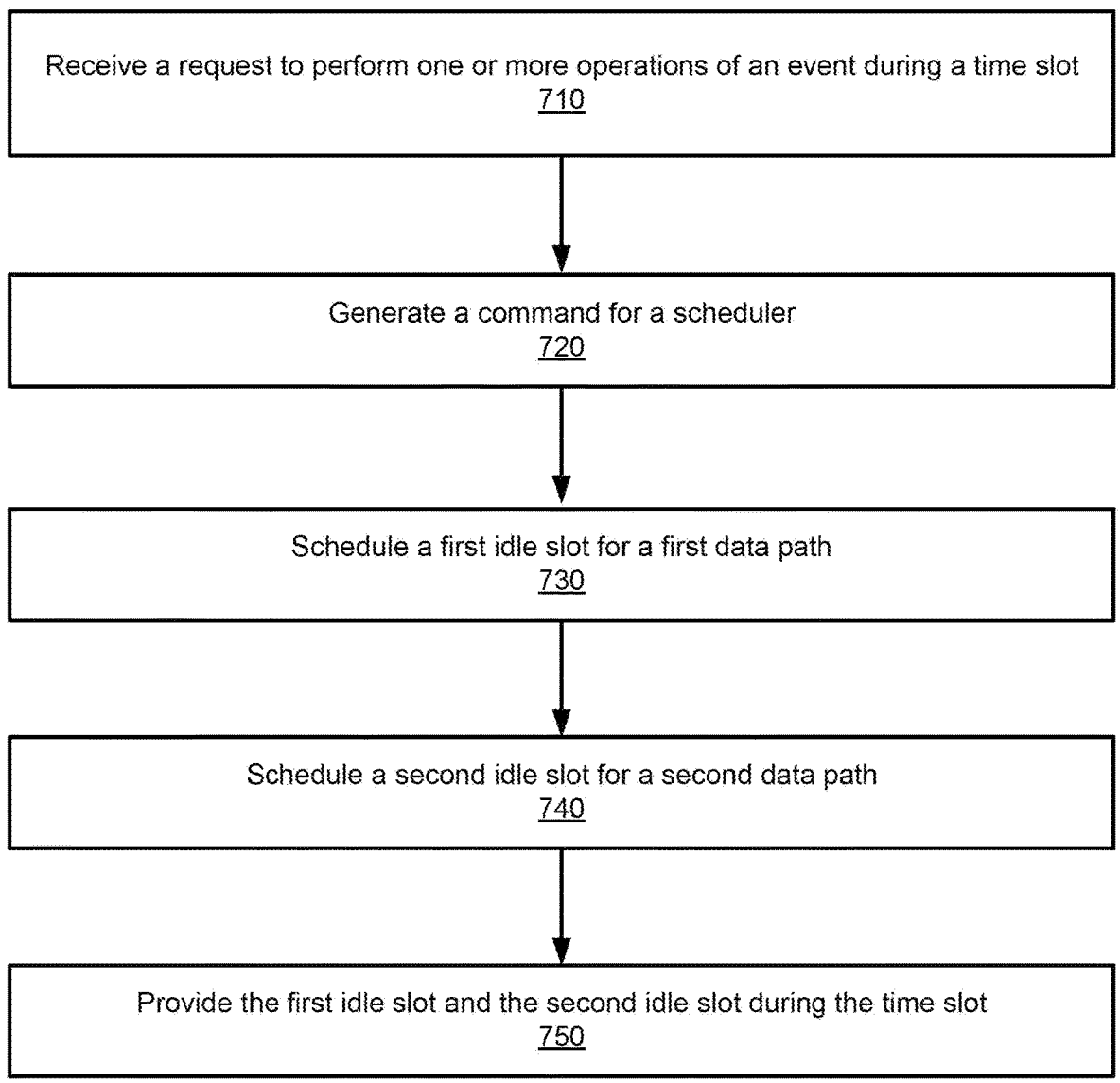
FIG. 7 is a flow chart of a process to schedule synchronized idle slots, according to one or more embodiments.

FIG. 7 is a flow chart of a process 700 to schedule synchronized idle slots, according to one or more embodiments. In some embodiments, the process 700 is performed by a network system (e.g., system 400 shown in FIG. 4 or other systems shown in FIGS. 1A, 1B, 2A-2H). In some embodiments, the process 700 is performed by other entities. In some embodiments, the process 700 includes more, fewer, or different steps than shown in FIG. 7.

In one approach, an arbiter 350 receives 710 a request to perform one or more operations of a task. The task may be performed or scheduled to be performed during a clock cycle. Examples of a task may include power saving, hardware learning, time spacing, etc. The request may be generated by a centralized control unit (or a processor).

In one approach, the arbiter 350 generates 720 a command for a scheduler 410, based on the request. For example, the arbiter 350 may generate an idle slot request command 438. The arbiter 350 may provide the idle slot request command 438 to the scheduler 410 and/or the read control circuit 430.

In one approach, the scheduler 410 schedules 730 a first idle slot for a first data path (e.g., data path 110A), and schedules 740 a second idle slot for a second data path (e.g., data path 110B). For example, in response to the idle slot request command 438, the scheduler 410A may generate a first idle slot or a packet with no data according to the schedule for the first data path, and provide the first idle slot or packet with no data to an event FIFO 420A. For example, in response to the idle slot request command 438, the scheduler 410B may generate a second idle slot or a packet with no data according to the schedule for the second data path, and provide the second idle slot or packet with no data to an event FIFO 420B.

In one approach, the arbiter 350 provides 750 the first idle slot and the second idle slot during the time slot. For example, the read control circuit 430A may receive the idle slots or packets with no data from the FIFOs 420A, 420B, and provide the idle slots to the arbiter 350A during the clock cycle. In one example, the read control circuit 430 may receive an idle slot request command 438 from the arbiter 350, and bypass reading packets from corresponding FIFOs 420, in response to the idle slot request command 438. By bypass reading packets from corresponding FIFOs 420, idle slots (or packets with no data) can be provided to the arbiter 350. The arbiter 350 may provide the first idle slot and the second idle slot from the read control circuit 430 at its outputs. By providing the synchronized idle slots as disclosed herein, various operations of the task can be supported.

Figure 8:
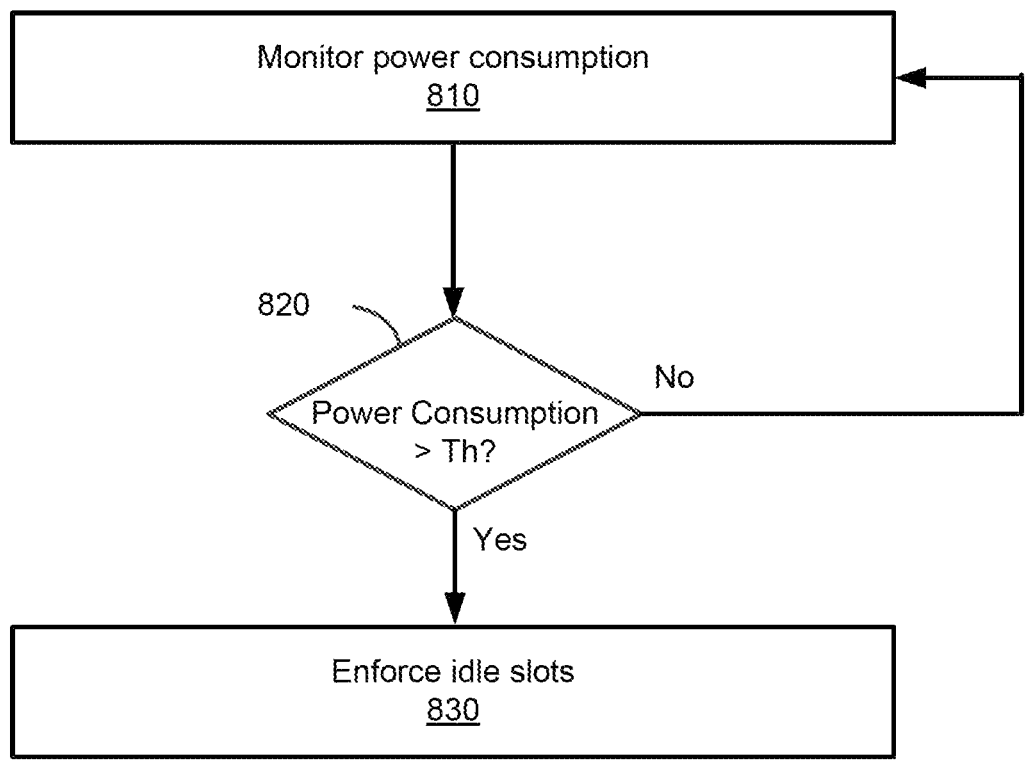
FIG. 8 is a flow chart of a process to reduce power consumption by scheduling idle slots, according to one or more embodiments.

FIG. 8 is a flow chart of a process 800 to reduce power consumption by scheduling idle slots, according to one or more embodiments. In some embodiments, the process 800 is performed by a network system (e.g., system 400 shown in FIG. 4 or other systems shown in FIGS. 1A, 1B, 2A-2I). In some embodiments, the process 800 is performed by other entities. In some embodiments, the process 800 includes more, fewer, or different steps than shown in FIG. 8.

In one approach, the system 400 monitors 810 power consumption of the system 400. For example, the system 400 may include a power detector that detects or monitors power consumption of the system 400.

In one approach, the system 400 determines 820 whether the power consumption of the system is larger than a threshold value or a threshold amount. If the detected power consumption is less than the threshold value, the system 400 may proceed to the step 810.

If the detected power consumption is larger than the threshold value, the system 400 may proceed to the step 830. For example, the arbiter 350 may enforce idle slots, in response to determining that the power consumption exceeding the threshold value. The arbiter 350 may cause the scheduler 410 to schedule idle slots for a predetermined number of clock cycles. By enforcing idle slots, the arbiter 350 or other components may not process data, such that power consumption of the system 400 can be reduced. After the predetermined number of clock cycles, the process 800 may proceed to the step 810.

FIG. 9 is a flow chart of a process 900 to synchronize operations of two arbiters to prevent a packet collision, according to one or more embodiments. In some embodiments, the process 900 is performed by a network system (e.g., system 400 shown in FIG. 4 or other systems shown in FIGS. 1A, 1B, 2A-2I). In some embodiments, the process 900 is performed by other entities. In some embodiments, the process 900 includes more, fewer, or different steps than shown in FIG. 9.

In one approach, a processor (e.g., processor or a centralized control circuit of the system 400) determines 910 to support or provide a packet collision avoid mode. The processor may determine to support or provide the packet collision avoid mode, in response to a user instruction or in response to detecting that a packet collision rate has exceeded a predetermined threshold.

In one approach, the processor selects 920 the first arbiter 350A. In one example, the processor may select the first arbiter 350A to provide a first data packet, based on a priority, where the master arbiter 350A may have a higher priority than the slave arbiter 350B. In one example, the processor may select the first arbiter 350A, in response to the data path 110A associated with the first arbiter 350A receiving a packet before data paths 110E-110H associate with the second arbiter 350B.

In one approach, the processor causes the first arbiter 350A to provide 930 the first data packet from the data path 110A during a first clock cycle, while the second arbiter 350B provides idle slots. For the example, the processor may generate a command to cause the first arbiter 350A and the second arbiter 350B to synchronize with each other through the synchronization command 445. In addition, the processor may generate a command to cause the first arbiter 350A to provide the first data packet from the data path 110A at an output 495A and to provide a no data packet at an output 495B during the first clock cycle. The processor may also generate a command to cause the second arbiter 350B to provide or enforce idle slots at its outputs 495C, 495D during the first clock cycle.

In one approach, after providing the first packet, the processor selects 940 the second arbiter 350B, and causes the second arbiter 350B to provide 950 a second data packet from the data path 110E during a second clock cycle, while the first arbiter 350A provides idle slots. For example, the processor may generate a command to cause the arbiter 350B to provide the second data packet from the data path 110E at an output 495C and to provide a no data packet at an output 495D during the second clock cycle. The processor may also generate a command to cause the arbiter 350A to provide or enforce idle slots at its outputs 495A, 495B during the second clock cycle.

Accordingly, the arbiters 350A, 350B may operate in a synchronized manner to avoid a packet collision. By avoiding packet collisions, power consumption of the system 400 can achieve lower power consumption and higher throughput.

Many aspects of the above-described example process 700-900, and related features and applications, may also be implemented as software processes that are specified as a set of instructions recorded on a computer readable storage medium (also referred to as computer readable medium), and may be executed automatically (e.g., without user intervention). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 10:
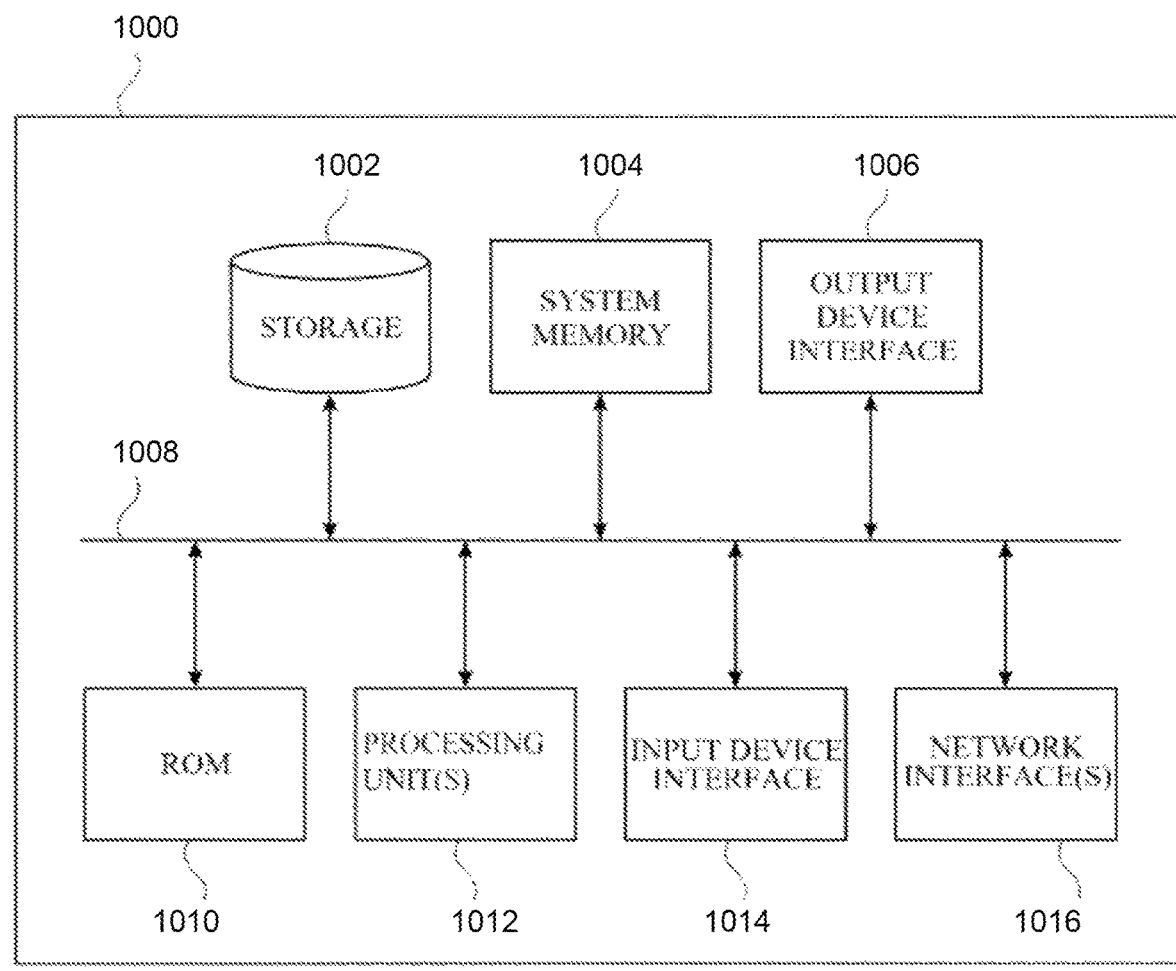
FIG. 10 illustrates an electronic system, according to one or more embodiments.

FIG. 10 illustrates an electronic system 1000 with which one or more implementations of the subject technology may be implemented. The electronic system 1000 can be, and/or can be a part of, the network switch 104 shown in FIG. 1B. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, components, elements, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
receiving, by an arbiter of a network system to arbitrate a first set of packets from a first data path and a second set of packets from a second data path, a request for a task, the task to be performed during a clock cycle;
generating, by the arbiter based on the request, a command to cause a scheduler of the network system to:
schedule a first idle slot for the first data path, and
schedule a second idle slot for the second data path; and
providing, by the arbiter, the first idle slot and the second idle slot during the clock cycle.

2. The method of claim 1, further comprising:
bypassing, by a read control circuit coupled between the first data path and the arbiter and coupled between the second data path and the arbiter, reading a packet from the first data path during the clock cycle to generate the first idle slot; and
bypassing, by the read control circuit, reading a packet from the second data path during the clock cycle to generate the second idle slot.

3. The method of claim 2, further comprising:
receiving, by the arbiter from the read control circuit, a first indication indicating that the first idle slot is generated in response to the command; and
receiving, by the arbiter from the read control circuit, a second indication indicating that the second idle slot is generated in response to the command.

4. The method of claim 1, further comprising:
generating, by another arbiter of the network system to arbitrate a third set of packets from a third data path and a fourth set of packets from a fourth data path, another command to cause the scheduler to schedule a third idle slot for the third data path.

5. The method of claim 4, further comprising:
generating, by the another arbiter, the another command to cause the scheduler to schedule a fourth idle slot for the fourth data path.

6. The method of claim 5, further comprising:
synchronizing, by the arbiter, the first idle slot, the second idle slot, the third idle slot, and the fourth idle slot.

7. The method of claim 1, wherein the command causes the scheduler to:
schedule one or more idle slots for the first data path, and
schedule one or more additional idle slots for the second data path.

8. The method of claim 1, further comprising:
receiving, by the arbiter, another request to output a packet during another clock cycle;
determining, by the arbiter, the another request is an erroneous request; and
generating, by the arbiter in response to determining that the another request is the erroneous request, another command to cause the scheduler to:
schedule a first set of idle slots for the first data path, and
schedule a second set of idle slots for the second data path; and
providing, by the arbiter, the first set of idle slots and the second set of idle slots during a plurality of clock cycles including the another clock cycle.

9. The method of claim 1, further comprising:
receiving, by the arbiter, another request for a warm boot during a set of clock cycles,
wherein the first data path and the second data path have no data packet during the set of clock cycles, and
wherein the arbiter is configured to ignore a packet spacing rule during the set of clock cycles to support the warm boot, in response to the another request.

10. A network system comprising:
a first data path to provide a first set of packets;
a second data path to provide a second set of packets;
an arbiter configured to:
arbitrate the first set of packets and the second set of packets,
receive, a request for a task, the task to be performed during a clock cycle, and
generate a command based on the request; and
a scheduler configured to:
schedule, in response to the command, a first idle slot for the first data path, and schedule, in response to the command, a second idle slot for the second data path, wherein the arbiter is configured to provide the first idle slot and the second idle slot during the clock cycle.

11. The network system of claim 10, further comprising:
a read control circuit coupled between the first data path and the arbiter and between the first data path and the arbiter, the read control circuit configured to:
bypass reading a packet from the first data path during the clock cycle to generate the first idle slot, and
bypass reading a packet from the second data path during the clock cycle to generate the second idle slot.

12. The network system of claim 11, wherein the arbiter is configured to:
receive, from the read control circuit, a first indication indicating that the first idle slot is generated in response to the command, and
receive, from the read control circuit, a second indication indicating that the second idle slot is generated in response to the command.

13. The network system of claim 10, further comprising:
a third data path to provide a third set of packets;
a fourth data path to provide a fourth set of packets; and
another arbiter configured to:
arbitrate the third set of packets and the fourth set of packets, and
generate another command,
wherein the scheduler is configured to schedule, in response to the another command, a third idle slot for the third data path.

14. The network system of claim 13, wherein the arbiter is configured to synchronize the first idle slot, the second idle slot, and the third idle slot.

15. The network system of claim 14, wherein the another arbiter is configured to provide a data packet of the fourth set of packets from the fourth data path during the clock cycle, while providing the first idle slot, the second idle slot, and the third idle slot.

16. The network system of claim 10, wherein the scheduler is configured to:
schedule, in response to the command, one or more idle slots for the first data path, and
schedule, in response to the command, one or more additional idle slots for the second data path.

17. The network system of claim 10,
wherein the arbiter is configured to:
receive another request to output a packet during another clock cycle,
determine the another request is an erroneous request, and
generate another command, in response to determining that the another request is the erroneous request,
wherein the scheduler is configured to:
schedule a first set of idle slots for the first data path, and
schedule a second set of idle slots for the second data path, and
wherein the arbiter is configured to provide the first set of idle slots from the first data path and the second set of idle slots from the second data path during a plurality of clock cycles including the another clock cycle.

18. A non-transitory computer readable medium storing instructions when executed by one or more processors cause the one or more processors to:
receive a request for a task, the task to be performed during a clock cycle; and
generate, based on the request, a command to cause a scheduler of a network system to:
schedule a first idle slot for a first data path of the network system, and
schedule a second idle slot for a second data path of the network system; and
provide the first idle slot and the second idle slot during the clock cycle.

19. The non-transitory computer readable medium of claim 18, wherein a read control circuit coupled between the first data path and an arbiter and between the second data path and the arbiter is configured to:
bypass reading a packet from the first data path during the clock cycle, and
bypass reading a packet from the second data path during the clock cycle.

20. The non-transitory computer readable medium of claim 19, further storing instructions when executed by the processor cause the process to:
cause the read control circuit to provide a first indication to the arbiter, the first indication indicating that the first idle slot is generated in response to the command; and
cause the read control circuit to provide a second indication to the arbiter, the second indication indicating that the second idle slot is generated in response to the command.

* * * * *